July 19, 1927.
A. ELLIOTT
1,636,296
PROCESS OF OXIDIZING FERROUS SULPHATE IN SOLUTION
Filed March 31, 1926
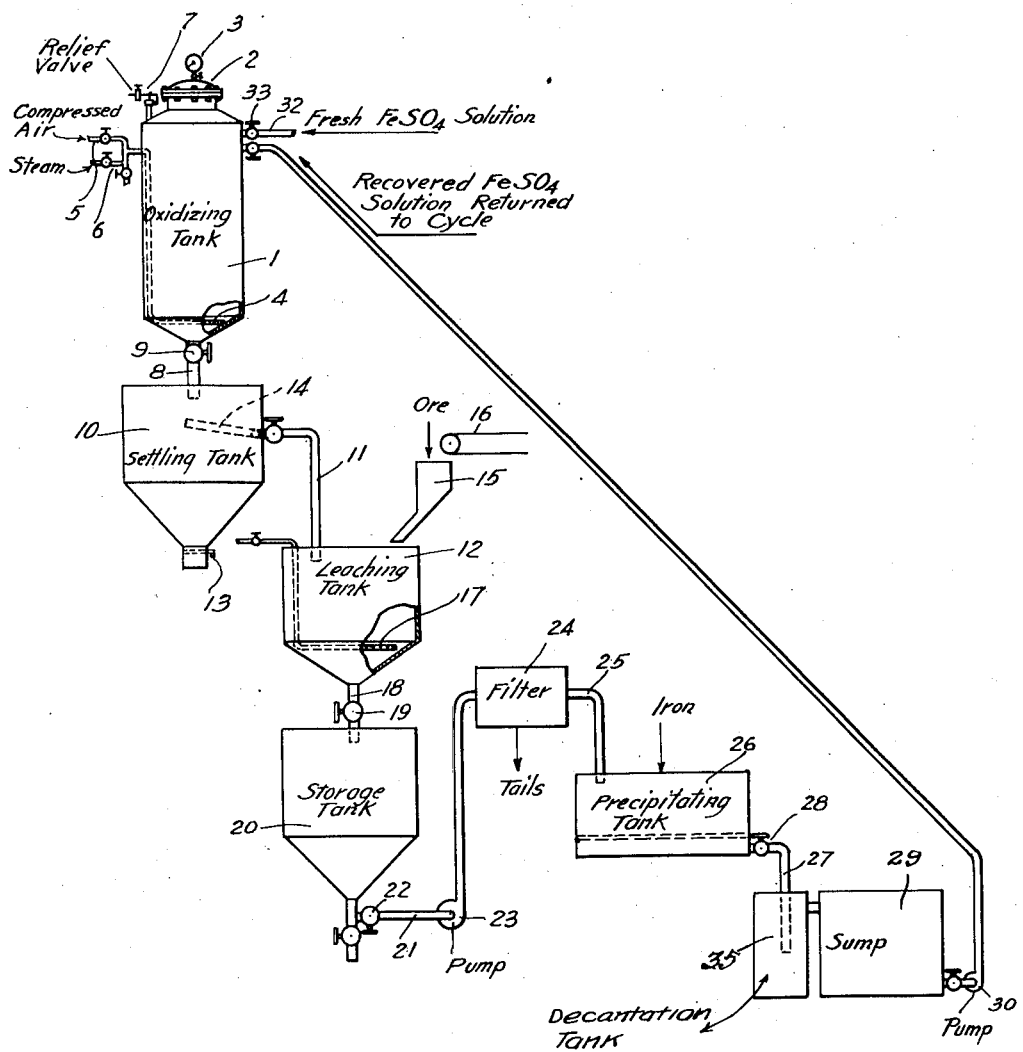
INVENTOR.
Alexander Elliott
BY Arthur P. Knight
ATTORNEY.

Patented July 19, 1927.

1,636,296

UNITED STATES PATENT OFFICE.

ALEXANDER ELLIOTT, OF LOS ANGELES, CALIFORNIA.

PROCESS OF OXIDIZING FERROUS SULPHATE IN SOLUTION.

Application filed March 31, 1926. Serial No. 98,828.

This invention relates to the recovery of copper or other metals from oxide or oxidized ores thereof and the main object of the invention is to provide for effective, rapid and economical production of a leaching solution for use in extraction of the copper or other metal. According to my present invention a solution of ferrous sulphate is first oxidized with air at a suitable pressure greater than atmospheric and preferably at a temperature in excess of atmospheric temperature but not above 100 degrees centigrade until all or substantially all of the ferrous sulphate has reacted, resulting in the formation of ferric sulphate in solution. The solution of ferric sulphate thus formed may then be used to leach the ore, for example, a copper ore, forming a solution of copper sulphate. Such solution may then be treated in any suitable manner to produce metallic copper.

The accompanying drawing illustrates diagrammatically an apparatus suitable for carrying out my invention in connection with a leaching operation, and referring thereto:

Such apparatus may comprise an oxidizing or reaction vessel such as tank 1 of any suitable size, for example sufficiently large to hold a quantity of ferric sulphate solution capable of leaching a batch of the ore to be treated. Said tank 1 is so constructed as to withstand whatever pressure is to be used in the oxidizing operation and must also be capable of resisting corrosion by the sulphate solution. For this purpose tank 1 may be formed of wood suitably supported or mounted and re-enforced to withstand the said pressure or it may be of iron or steel construction lined with wood, lead, or other resistant material.

Tank 1 may be provided with suitable means, such as a manhole or removable cover 2 at its top, to permit inspection and cleaning of the same and with an outlet or discharge pipe 8, provided with valve 9, at its bottom, for discharging the contents after oxidation is complete. Means are also provided for supplying compressed air, preferably together with steam, to tank 1, said means comprising, for example, a perforated distributing pipe 4, extending in the lower part of said tank and connected to a pipe 5 for supplying compressed air from a suitable source at a pressure greater than atmospheric, say 25 pounds to the square inch, and to a pipe 6 for supplying steam. The steam so supplied may be at about the same pressure as the air and at a temperature corresponding to such pressure, or it may be superheated if desired, but in any case the amount of steam admitted is only sufficient to heat the liquid to the desired temperature, namely above room temperature but not above 100 degrees centigrade. Suitable pressure controlling means, such as a relief valve 7, are provided for maintaining a definite pressure in the tank 1, and said tank may also be provided with a pressure gage 3 for indicating the pressure in the tank.

From tank 1 discharge pipe 8 may lead for example to a settling tank 10 or to any other suitable means for separating solids from liquids, for example, a filter, and from said separating means a liquid conducting pipe 11 leads to a leaching tank 12. Settling tank 10 may for example be provided with a conical bottom and with suitable gate means 13 for discharging settled solid material therefrom or any other suitable means may be provided for removing such material from tank 10 after the liquid has been withdrawn. In order to facilitate the removal of liquid from tank 10 without disturbing the settled solid material, pipe 11 may be provided at its inlet with a swing-pipe 14 which may be raised or lowered so as to withdraw liquid at any desired level. Instead of a settling tank such as that shown, in which the settling is intermittent, continuous settlers or thickeners of any suitable type may be used, or a filter press may be employed to separate the solid material from the ferric sulphate solution.

Leaching tank 12 is provided with suitable means for introducing therein a batch of the ore to be treated, such means comprising for example, a hopper or delivery chute 15, into which the ore may be fed for example by belt conveyor 16 or other suitable means. Said leaching tank is also provided with suitable means for agitating the contents thereof, for example, a perforated pipe 17 for admission of air under pressure. From leaching tank 12 a discharge pipe 18 provided with valve 19 leads to a storage tank 20 for the material after leaching and before removal of the tails. From tank 20 pipe 21 provided with valve 22 and pump 23 leads to a filter 24 from which the liquid outlet 25 for conducting filtered liquid leads to a precipitating tank 26. Filter 24 may be of the continuous rotary type or of any other type commonly used for this purpose. Pipe 27 provided with valve 28 is provided for conducting the barren regenerated ferrous sulphate solution from tank 26 to sump 29 and suitable means such as pump 30 and pipe 31 are provided for returning solution from the sump to the oxidizing tank 1. A pipe 32 having valve 33 is adapted to supply fresh ferrous sulphate solution to tank 1. Suitable means such as a decantation tank 35, or a filter, may be provided for separating the precipitated copper from the solution before it passes to sump 29. Instead of the type of leaching tank shown I may use any other suitable type of tank provided with agitating means, a Pachuca tank for example being especially adapted for this purpose.

The process, including my improved method of producing the ferric sulphate leaching solution, may be carried out in the above described apparatus as follows:

A suitable amount of ferrous sulphate solution of desired concentration which may comprise recovered solution supplied through pipe 31, with or without additional fresh solution introduced through pipe 32, is admitted to the oxidizing tank 1 and steam is then admitted through the perforated pipe 4 or the solution is otherwise heated in any suitable manner until the desired temperature is obtained. I have found that for the oxidizing action temperatures in excess of atmospheric temperature are advantageous and I therefore heat the solution to a temperature above 20 degrees centigrade but not above 100 degrees centigrade. In order to maintain the desired pressure within tank 1, relief valve 7 is so adjusted that it will allow the escape of steam or air when such pressure is attained and the desired pressure is therefore constantly maintained within tank 1 during the oxidizing action. The solution having been brought to the desired temperature, air under pressure is then admitted, such air being preferably heated before admission to the liquid in the tank, for example, by continuously admitting a small amount of steam along with the air, the amount of steam so supplied being sufficient to heat the air and to maintain the desired temperature of the liquid during the oxidizing operation. While the air inside the oxidizing tank is therefore maintained at a pressure above atmospheric, a certain amount of air is continually escaping through the relief valve 7 and there is therefore a continual upward current of air through the liquid in the tank which serves to both agitate the charge and to oxidize the ferrous sulphate to ferric sulphate and in general the more rapidly the air is forced into and through the solution the more rapid will be the oxidation. It will thus be seen that the ferrous sulphate solution is continually subject throughout to the oxidizing action of air under a pressure greater than atmospheric and at a temperature higher than atmospheric. In case the above method of heating the air and the solution during oxidation requires the use of so much steam as to materially dilute the solution, the air may be heated indirectly for example by passing through steam-jacketed heating coils. Also, if desired, closed steam coils may be provided within tank 1, in order to heat the solution without causing dilution thereof. It should be observed however that, due to the continual current of hot air through the solution, there will be a certain amount of evaporation of water during the process which will tend to prevent dilution of the solution. The pressure which is maintained within the oxidizing tank during this operation is above atmospheric pressure but preferably below 30 pounds per square inch or about two atmospheres gage pressure.

Under the above conditions the oxidation of a substantial proportion of the ferrous sulphate to ferric sulphate is very rapid and effective. The reaction which occurs may be expressed as follows:

$$6 FeSO_4 + 1\tfrac{1}{2} O_2 = 2 Fe_2(SO_4)_3 + Fe_2O_3$$

It will be seen that while the ferrous sulphate which reacts is converted to ferric sulphate and remains in solution, part of the iron is converted to ferric oxide or rather in the presence of water to ferric hydroxide, which is precipitated. In addition there will in general be formed a slight amount of basic ferric sulphate containing varying proportions of ferric oxide and ferric sulphate in combination and these salts may also be precipitated together with the ferric hydroxide. The operation, when carried out under the above stated conditions, including maintenance of temperature above room temperature but not above 100 degrees centigrade, produces one mol of ferric sulphate, from three mols of ferrous sulphate, and there is no free acid produced, thereby giving maximum economy in the production of a ferric sulphate solution for leaching purposes.

As soon as the desired amount of the ferrous sulphate in the solution has been oxidized the supply of air may be shut off, the pressure relieved and the contents of the oxidizing tank drained into the separating means such as settling tank 10 for removal of the precipitated material from the ferric sulphate solution. From here the leaching solution may be conducted as desired to leaching tank 12, the ore crushed to suitable size for example to about 40 mesh, being also supplied to said tank. Suitable proportions of ore and leaching solution are added and agitated for sufficient time to dissolve all the copper in the ore according to the following equation:

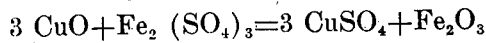
$$3\ CuO + Fe_2(SO_4)_3 = 3\ CuSO_4 + Fe_2O_3$$

The amounts of ore and leaching solution used will depend upon the capacity of the leaching tank, the copper content of the ore, and the concentration of the leaching solution, but the amount of such solution used should in general be slightly in excess of the amount theoretically required for dissolving the copper contained in the quantity of ore used, according to the above equation. The copper which may be dissolved by this treatment may comprise copper oxide as indicated in the above equation or copper carbonate or silicate, the result being in any case the formation of a solution containing copper sulphate and the precipitation of ferric oxide. After the leaching action is complete the contents of the leaching tank are passed to the storage tank 20 and from there to the filter 24 to separate the tails from the copper-containing solution, such solution being then conducted to the precipitating tank 26 in which the copper may be precipitated, for example with iron as follows:

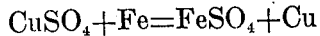
$$CuSO_4 + Fe = FeSO_4 + Cu$$

The ferrous sulphate solution so formed may be separated from the copper in any suitable manner after which it may be reused in a fresh operation. For this purpose such solution may be conducted to sump 29 and thence returned to the oxidizing tank. In addition to the possible loss of ferric sulphate in the form of basic salts precipitated with the ferric hydroxide during the oxidizing reaction there will of course be a slight mechanical loss for example in the tails discharged from filter 24 and sufficient fresh ferrous sulphate solution is added together with the recovered solution to the oxidizing tank 1 to make up for such loss. Such fresh solution may be introduced for example through pipe 32.

The loss of ferric sulphate in the form of basic salts precipitated with the ferric hydroxide, as above mentioned, is in any case very small, and does not interfere seriously with the economical operation of the process. Even this small loss may be eliminated however, if desired, by treating the ferric hydroxide precipitate removed from settling tank 10 and containing small amounts of such basic salts, with sufficient sulphuric acid to convert such basic salts entirely to ferric sulphate, the solution thus formed being added to the leaching solution or to the recovered solution, for example in sump 29.

The ferric hydroxide produced in the oxidizing operation in some cases forms a valuable by-product and may be sold for example for use in paints, etc., or if it is economical to do so it may be treated with sulphuric acid to form fresh sulphate which may be returned to the process at a suitable point, for example, it may be introduced into the oxidizing tank 1.

While I have shown a single oxidizing tank, a battery of any desired number of such tanks may be employed in practice in order to afford a continuous supply of ferric sulphate solution, and the size and number of units provided for each of the other steps of the process may be increased to handle any desired tonnage of ore. In particular it is desirable to provide a plurality of settling tanks 10 in order that there will always be a supply of clear leaching solution on hand, or a storage tank may be provided between settling tank 10 and leaching tank 12.

Furthermore, while I have described the use of the ferric sulphate solution prepared in accordance with my invention in the leaching of copper ores, it will be understood that other metals, such as zinc, may be recovered from ores in a similar manner, the ferrous sulphate solution being in every case oxidized by the use of air at a pressure greater than atmospheric. In the case of zinc, however, other means must be used for removing it from solution after leaching, for example, the zinc may be recovered by electrolytic deposition.

The leaching agent produced according to my invention may also be advantageously employed in the treatment of ores containing gold together with copper. In such cases I may add chlorine in some form to the leaching solution prior to or during the leaching operation, so that the gold will be dissolved together with the copper. For this purpose I may use calcium hypochlorite (chloride of lime) which by hydrolysis yields chlorine and thereby dissolves the gold from the ore. In the subsequent operation of precipitation with iron, both the copper and gold will then be precipitated. The resulting deposited metal consisting of mixed gold and copper may be melted up together to form bullion, or may be further treated to separate the two metals.

My improved method consists essentially therefore, in the oxidation of a substantial amount of ferrous sulphate in solution to ferric sulphate by passing air throughout the solution at a pressure above atmospheric and below two atmospheres gage pressure, and at a temperature above atmospheric but not above 100 degrees centrigrade to produce a leaching solution which may be used to extract copper or other metal or metals from ores. It is also desirable, although not always essential, to afterward precipitate the metal or metals in such manner as to recover the ferrous sulphate in solution, and use the same over again in the process.

The oxidation of the ferrous sulphate to ferric sulphate in the oxidizing tank may be carried to any suitable degree of conversion, that is, until any desired substantial proportion of the ferrous sulphate has been oxidized. This proportion will in any case be that which is found to give the greatest economy of operation, it being understood that the rate of leaching secured will be substantially proportional to the proportion of ferric sulphate present in the leaching solution, but that the time required for oxidation increases with the proportion of ferric sulphate produced.

What I claim is:

1. The process which comprises heating a solution of ferrous sulphate in a closed reaction vessel, passing air into the vessel and through said solution while maintaining within the reaction vessel a pressure above atmospheric pressure but below 30 pounds per square inch gage pressure and a temperature above atmospheric temperature but below 100 degrees centigrade so as to produce ferric sulphate in solution substantially in the proportion of one mol of ferric sulphate for every three mols of ferrous sulphate used.

2. The process which comprises passing air through hot ferrous sulphate solution under a pressure in excess of atmospheric pressure and at a temperature above atmospheric temperature but below 100 degrees centigrade to produce ferric sulphate in solution.

In testimony whereof I have hereunto subscribed my name this 23d day of March 1926.

ALEXANDER ELLIOTT.